Feb. 26, 1957 L. F. BEACH 2,782,642
EVACUATED GYROSCOPIC ASSEMBLY
Original Filed Jan. 16, 1948 2 Sheets-Sheet 1
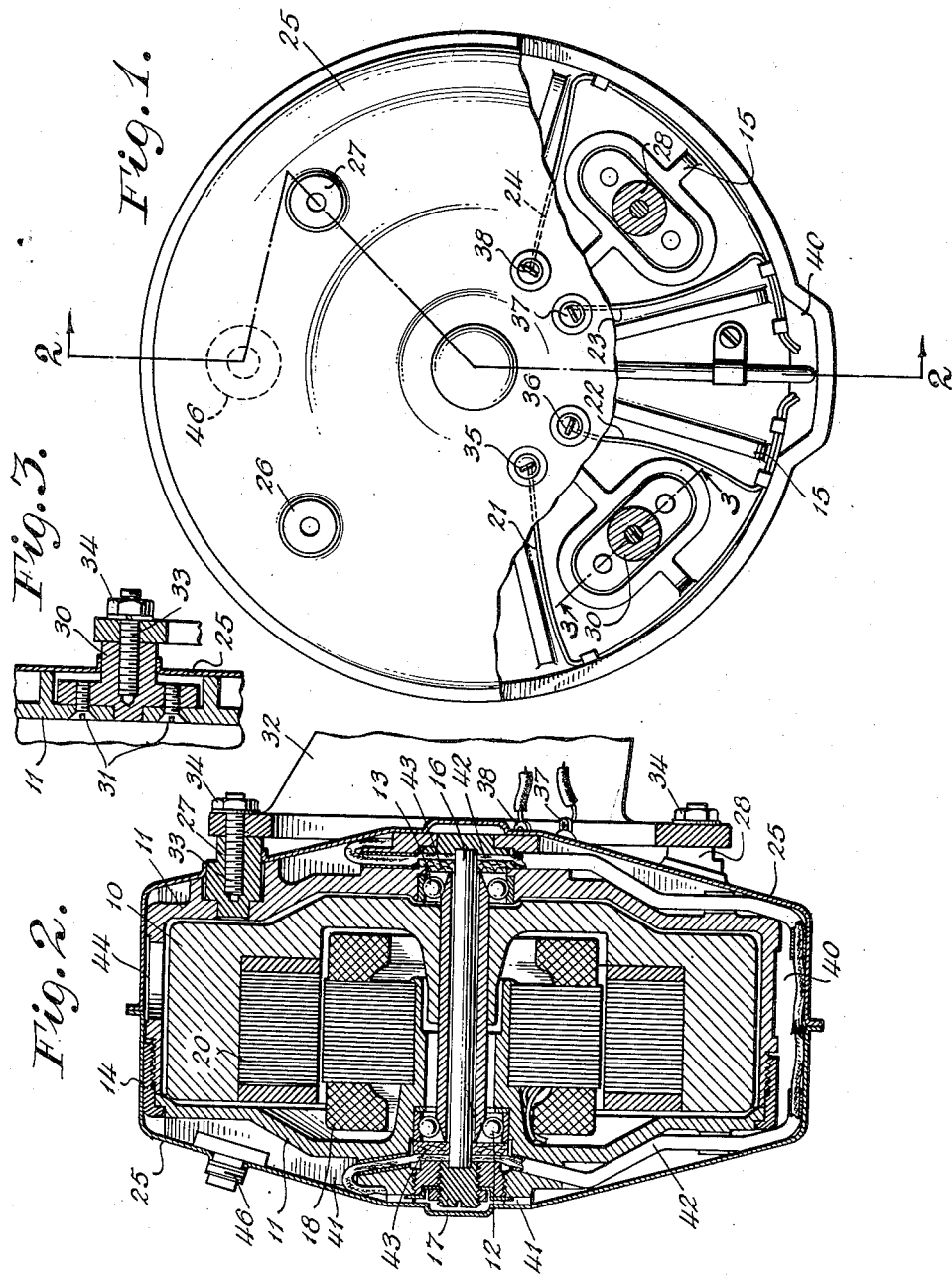
INVENTOR
LENNOX F. BEACH
BY
his ATTORNEY.

United States Patent Office 2,782,642
Patented Feb. 26, 1957

2,782,642

EVACUATED GYROSCOPIC ASSEMBLY

Lennox F. Beach, Sea Cliff, N. Y., assignor to Sperry Rand Corporation, a corporation of Delaware Continuation of application Serial No. 2,779, January 16, 1948. This application April 8, 1953, Serial No. 347,436

7 Claims. (Cl. 74—5)

This invention relates to an evacuated assembly for a gyroscopic rotor with self-lubricating bearings.

This application is a continuation of U. S. application Serial No. 2,779, entitled Evacuated Gyroscopic Assembly, which was filed in the name of Lennox F. Beach in the United States Patent Office on or about January 16, 1948, and which is now abandoned.

One of the objects of the invention is to provide self-contained assemblies or units of this character that may be readily removed from position in a gyroscopic instrument and replaced by similar units.

A further object of the invention is to provide a gyro unit of this character that may be mounted with the spin axis of the rotor in either a vertical or horizontal position.

Another object of the invention is to provide a gyroscopic assembly whose rotor and rotor supporting frame is accessible for adjustment and testing before the unit is sealed and evacuated.

Still another object of the invention is to eliminate the use of screw and gasket type external fittings for the assembly so as to maintain continuous airtightness of the unit.

One of the features of the invention resides in the provision of an integral airtight housing that fits on and envelopes the rotor supporting frame of the assembly or unit.

A further feature of the invention is provided by the mounting member for the assembly.

Another feature of the invention is provided by the oil sump and oil wick arrangement of the assembly which enables the rotor bearings to be lubricated properly regardless of position of the spin axis of the rotor.

Still another object of the invention is to provide an assembly of this character in which the ratio of gyro momentum to total weight of the unit is as high as possible. In the improved instrument this ratio is 5.5 pounds to 7.5 pounds.

The prior art, as indicated in Fig. 3 of U. S. Patent No. 1,279,471, issued September 17, 1918, to Elmer A. Sperry, shows an evacuated rotor case construction for gyro compasses. In this construction no equivalent for the housing shell of the unit is provided. This construction utilizes at least six gasket and screw fitting connections for the rotor case that are so leaky that it is necessary to provide evacuating equipment with the gyro compass and the same is used at regular intervals during operation of the gyro compass. In the improved instrument, the degree of vacuum is constant so that the operating characteristics of the unit do not change with a change in the degree of the vacuum within the case. A pump is eliminated as necessary equipment. In the prior art, the rotor is not accessible for testing. Furthermore, the rotor case is pivotally mounted on a vertical ring instead of being fixedly mounted as provided in the improved assembly. The rotor cases of the gyro compass shown in the art are not readily replaced by a unit of similar construction. Such a change requires a major overhaul of the instrument that would take days of work. In the type of instrument shown in the prior art, the ratio of gyro momentum to total weight of the rotor case is as low as 1 pound to 2 pounds.

Other objects, features and structural details of the invention will be apparent from the following description when read in relation to the accompanying drawings, wherein:

Fig. 1 is a side elevation of an assembly or unit constructed in accordance with the present invention with a portion of the airtight housing broken away;

Fig. 2 is a sectional view taken on line 2—2, Fig. 1;

Fig. 3 is a sectional view taken on line 3—3, Fig. 1; and

Figure 4:
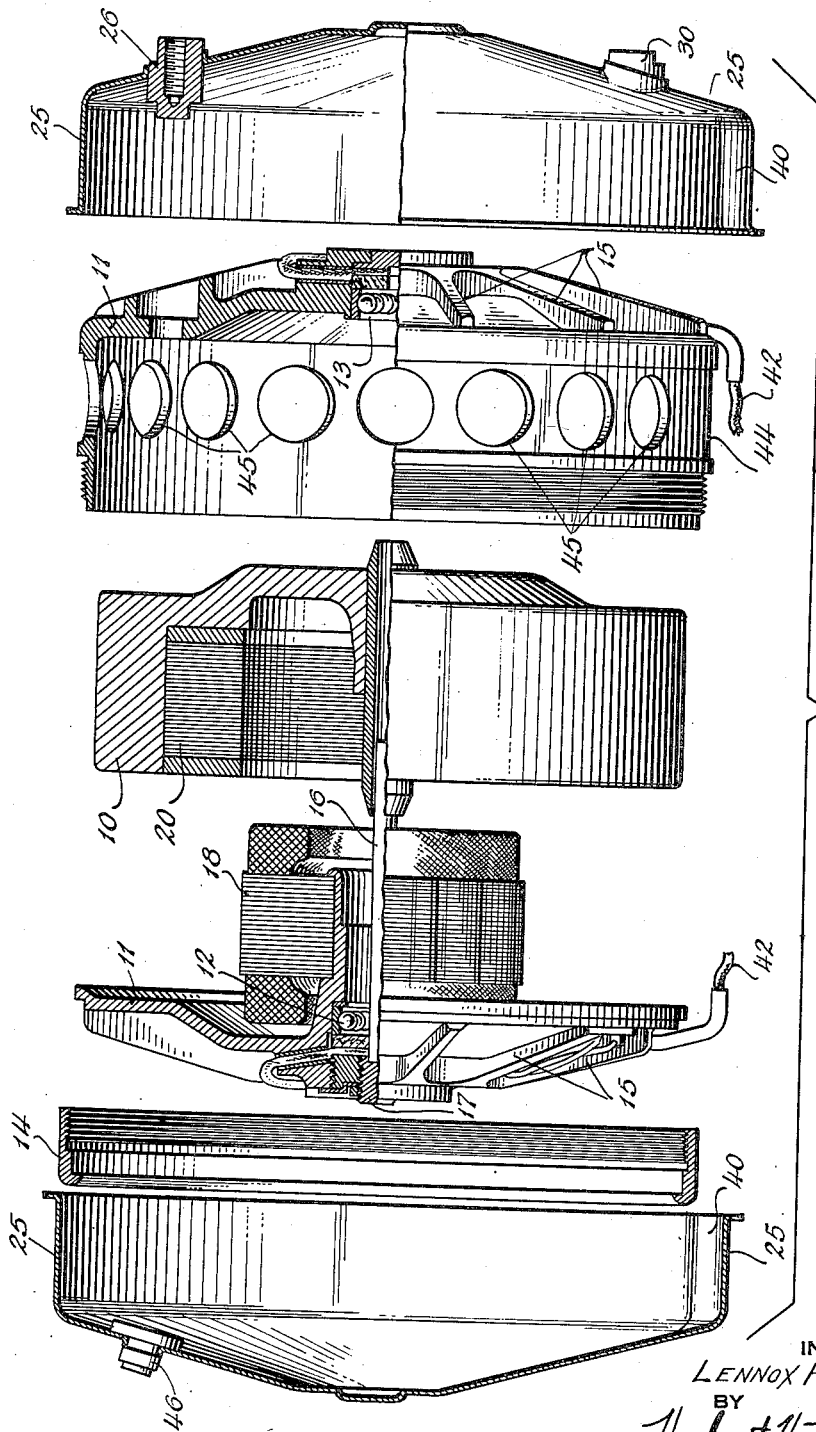
Fig. 4 is an exploded view of the assembly showing the individual parts in separated relation.

With reference to the drawings, a gyroscopic assembly embodying the present inventive concepts is shown to include a rotor 10 that is rotatably supported in a rotor frame 11 by means of the axially spaced bearings 12 and 13. As shown in Figs. 2 and 4, a threaded flanged ring 14 may be employed in assembling the rotor supporting inner parts of the skeleton frame 11. To keep the weight of the unit as light as possible for a given rotor weight, the frame 11 may be constructed of a metal such as magnesium. With such a light metal, the ends of the frame 11 may include a number of strengthening ribs as indicated at 15.

The mounting for the gyro rotor 10, as herein shown, is thermally compensated in accordance with the compression strut construction shown and claimed in my U. S. Letters Patent No. 2,353,139, issued July 11, 1944. In this arrangement, a strut 16, situated along the axis of the hollow shaft of the rotor, is compressed by a settable screw 17 to spread the end walls of the frame 11 and space the bearings 12 and 13 so the same do not bind due to thermal expansion of the parts when the rotor is spinning or to a slight contracting of the case when evacuated.

The gyroscopic rotor 10 is spun by electric motive means that is herein shown in the form of a squirrel cage induction motor whose wound stator 18 is fixed to the frame 11 and whose rotor 20 is formed as a part of the gyroscopic rotor 10. The input leads to the stator 18 of the electric motor are respectively indicated at 21, 22, 23 and 24, in Fig. 1.

In accordance with the invention, the assembly or unit further includes an airtight housing 25 that fits the curved periphery of the cylindrical frame and envelopes the frame. The housing 25 may be considered to be the outer part of a rotor frame whose inner parts are defined by the elements designated by the reference numbers 11. Housing 25 is a thin shell or cover of two main parts whose shape closely approximates that of the frame 11. The housing 25 is formed of sheet metal, such as tin-plated brass or cadmium-plated aluminum, whose parts are capable of being soldered together to form a completely airtight connection. It will be noted particularly herein that the parts of the assembly employed to maintain the vacuum within the assembly, are solder connected to prevent air leakage. Gasket and screw threaded type connections which are subject to leakage with use have been eliminated.

As the airtight housing 25 serves the sole function of maintaining the vacuum in the unit, the assembly is mounted by a number of mounting members that extend from the inner frame 11 through the housing. Four of such mounting members are shown in Fig. 1 in the form of rigid screw threaded bosses 26, 27, 28 and 30. The bosses, as shown in Fig. 3, are rigidly connected to the frame 11 by suitable means such as machine screws 31 and thus may be considered to be an integral part of the frame. The bosses are constructed of a material, such as the material of the housing, so that an airtight soldered connection can be made where these closely fitting parts join. The assembly is used in a gyroscopic instrument having a fixed or movable mounting piece 32 therein to which the unit may be fixedly connected by suitable screw stud and nut fastenings indicated at 33 and 34, respectively. The airtight housing or cover corresponds in shape to the generally cylindrical frame 11 that supports the gyroscopic rotor. The cover 25 fits on and completely envelops the frame 11 and includes therein a plurality of relatively small openings in one end thereof. The bosses 26, 27, 28 and 30 for each of the cover openings extend from the end of the frame 11 juxtaposed to the end of the cover having the openings therein. Each of the boss parts extends through a corresponding opening in the cover and the cover is sealed in an airtight fashion to and about the bosses as by soldering. Thus, a portion of each of the bosses extends exteriorly of the sealed cover. Fastening means, such as the screw threaded members or studs 33 and mating threaded elements or nuts 34 cooperate with the portion of each of the bosses which extends exteriorly of the sealed cover and are adapted securely but detachably to mount the bosses and hence the frame to the mounting piece 32 such that the bosses carry the entire load of the gyroscopic assembly while the enveloping cover for the frame is unstressed by the assembly load. The electrical leads 21, 22, 23 and 24 in the assembly have terminals 35, 36, 37 and 38 at the housing 25, the terminals being connected to the housing by means of an airtight glass-to-metal seal. The mounting piece 32 is adapted to hold the assembly, so that the rotor 10 spins about a horizontal axis as shown in Fig. 2. If this figure is viewed, so that piece 32 is situated above the assembly, it will be noted that in such a position the spin axis of the rotor 10 is vertical. The assembly is capable of being used with the axis of the rotor 10 in either a vertical or horizontal position. The assembly may be readily removed from position in the gyroscopic instrument by detaching the exterior leads to terminals 35, 36, 37 and 38 and by disconnecting the nuts 34. A replacement unit can be readily substituted for the one removed by a reverse procedure. It is not necessary to handle any moving parts in making the replacement and the removed assembly or unit is still evacuated.

In accordance with the invention, the airtight housing includes an internal cavity therein providing an oil sump by means of which the bearings 12 and 13 are kept lubricated. Two of such sumps are provided, as herein shown, the first being defined by boss 40 adjacent the curved periphery at the bottom of the cylindrical frame 11. A single oil wick 42 connects the respective sumps and the felt pads 43 at the bearings 12 and 13. When the assembly is employed as a directional gyro and the rotor 10 is spinning about a horizontal axis, boss 40 provides the oil sump for the unit and oil is supplied to the pads 43 by way of the wick 42 from cavity 40. When the assembly is employed as a gyro vertical, and the rotor 10 is spinning about a vertical axis, cavity 41 provides the oil sump for the unit and oil is supplied to the pads 43 by way of the wick from cavity 41.

The rotor 10 spins in an oil vapor and the oil condensing on the rotor is thrown off by centrifugal force and returned to cavity defining boss 40 or cavity 41 by way of an exterior annular groove 44 about the cylindrical periphery of the inner frame 11. The frame 11 includes a plurality of openings 45 in the groove 44 and oil thrown off by the rotor passes through the openings 45 and returns to boss 40 by way of the groove 44. Boss 40 is situated adjacent the groove 44. When the unit is employed as a gyro vertical, the oil in groove 44 drops by gravity into the cavity 41 by way of boss 40.

In assembly cover 25 with bosses 26, 27, 28 and 30 are first attached to frame 11. The inside parts consisting of frame parts 11 and rotor 10 are then connected together by ring 14. This unit is accessible for testing and adjustment before the housing parts 25 are fitted over the same. The rotor 10 is accessible so that bearing resistance can be felt by turning the rotor. The rotor is accessible for adjustments. The partly assembled unit is subjected to a bell jar test in a vacuum, before it is sealed, for power consumption and coasting characteristics. With the inner parts properly regulated, the housing parts 25 are telescopically fitted over the same and joined by soldered connections and the seals for the terminals 35, 36, 37 and 38 are made. The two-part case construction permits soldering of the thin metal shell at low temperatures and minimum heat. Oil is then introduced into the assembly by way of a vacuum seal element 46 soldered to the housing 25. Air to the required degree is then withdrawn from the interior of the unit by way of element 46 by a suitable negative pressure apparatus (not shown). The final operation takes place when element 46 is sealed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An evacuated gyroscopic assembly comprising a rotor, a cylindrical frame rotatably supporting said rotor, and an airtight housing enveloping and fitting on said frame, said housing having a boss defining a first oil sump providing cavity adjacent the curved peripheral surface of the frame and a portion defining a second oil sump providing cavity adjacent one of the ends of the cylindrical frame.

2. An assembly as claimed in claim 1, including bearing means in said frame for rotatably supporting said rotor, and an oil wick connecting said bearing means, said first cavity and said second cavity.

3. An evacuated gyroscopic assembly comprising a rotor, a rotor frame, axially spaced bearings carried by said frame for supporting said rotor for movement about either a vertical or horizontal axis, an airtight housing fitting on and enveloping said frame, said housing having an internal cavity therein providing an oil sump when the rotor is supported about a horizontal axis and having a second internal cavity therein providing an oil sump when the rotor is supported about a vertical axis, and a single oil wick connecting said sumps and the axially spaced bearings.

4. An evacuated gyroscopic assembly comprising a rotor, a hollow cylindrical frame supporting said rotor for movement about an axis coincident with the cylindrical axis of the frame, and a hollow cylindrical, airtight housing enveloping and fitting on the curved periphery of the frame, said frame having an exterior annular groove about its cylindrical periphery with a plurality of openings therein, said housing having an oil sump formed by a boss situated adjacent the annular groove in said frame.

5. An evacuated gyroscopic assembly comprising a rotor, a hollow cylindrical rotor frame, bearing means carried by said frame for supporting said rotor for movement about a horizontal axis coincident with the cylindrical axis of the frame, a hollow cylindrical, airtight, housing enveloping and fitting on the curved periphery of the frame, said frame having an exterior annular groove about its cylindrical periphery with a plurality of openings therein, said housing having an oil sump formed by a boss situated at the bottom of its internal cylindrical periphery adjacent the annular groove in said frame, and an oil wick connecting said sump and said bearing means.

6. In combination, an evacuated gyroscopic assembly comprising a generally cylindrical frame supporting a gyroscopic rotor, said frame having a plurality of substantially rigid bosses protruding from one end thereof and adapted when fastened to a mounting member securely to support said frame thereon, a correspondingly shaped, thin, metallic cover fitted on and completely enveloping said frame, said cover having a corresponding plurality of openings therein adapted to accommodate the respective bosses on said frame, said protruding bosses extending through said cover openings to provide boss portions which are exterior of said cover, and said cover being sealed in an airtight fashion to and about said bosses, and fastening means cooperable with said bosses for securing said bosses to said mounting member whereby said bosses carry the entire load provided by the gyroscopic assembly while the enveloping cover for the frame is unstressed by said load.

7. The combination in an evacuated gyroscopic assembly as set forth in claim 6 wherein said fastening means comprises threaded members on said bosses and mating threaded elements cooperable therewith for detachably securing said bosses to said mounting member.

References Cited in the file of this patent
UNITED STATES PATENTS

| | | |
|---|---|---|
| 1,279,471 | Sperry | Sept. 17, 1918 |
| 1,866,733 | Tanner | July 12, 1932 |
| 2,413,285 | Bousky | Dec. 31, 1946 |
| 2,641,132 | Barkalow | June 9, 1953 |
| 2,641,134 | Kenyon | June 9, 1953 |